C. C. HAMILTON.
AGRICULTURAL IMPLEMENT.
APPLICATION FILED DEC. 1, 1919.
1,341,231.
Patented May 25, 1920.
2 SHEETS—SHEET 1.
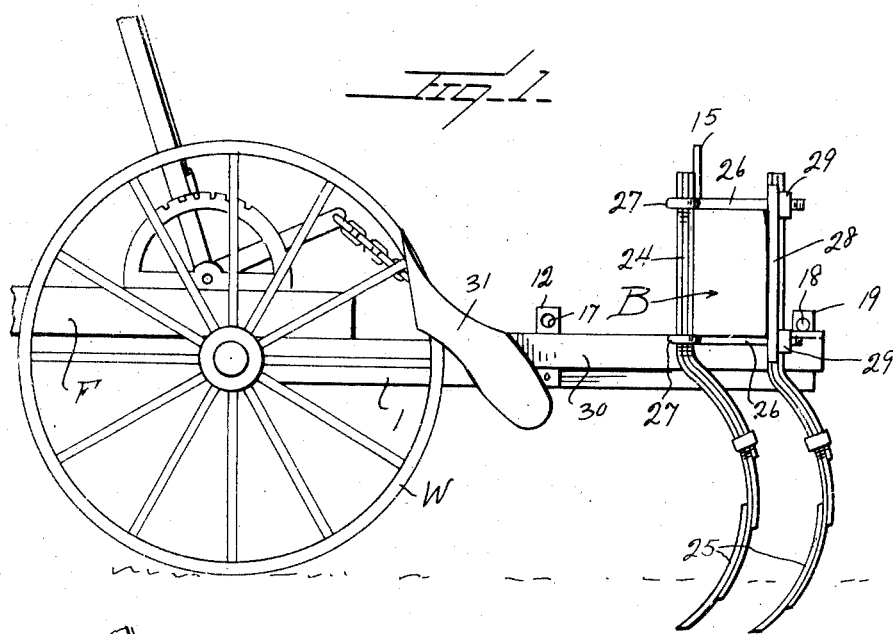
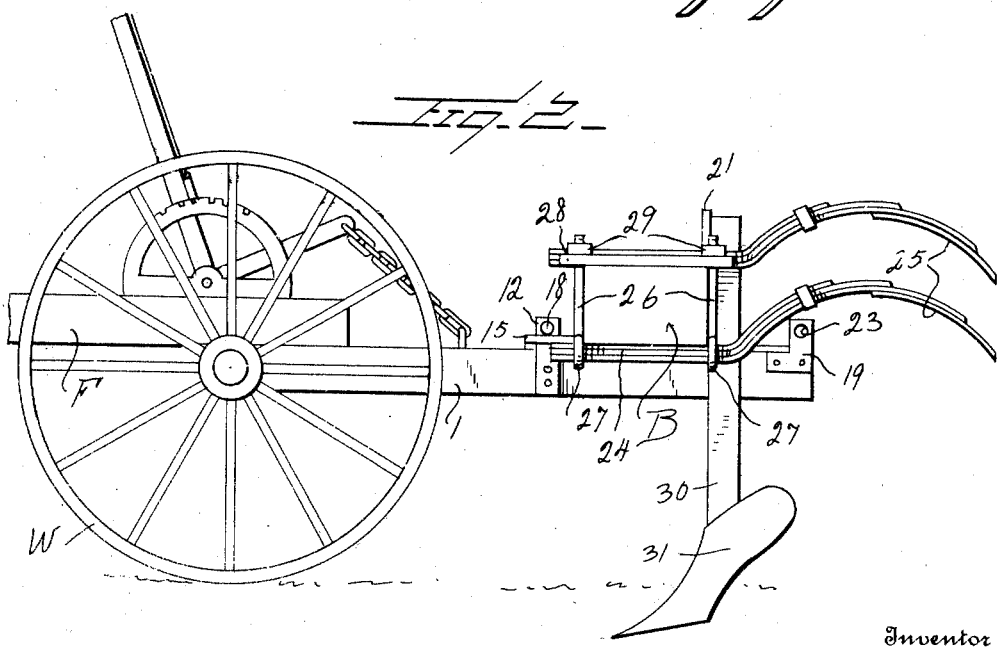
Inventor
C. C. Hamilton
By Watson E. Coleman
Attorney C. C. HAMILTON.
AGRICULTURAL IMPLEMENT.
APPLICATION FILED DEC. 1, 1919.
1,341,231.
Patented May 25, 1920.
2 SHEETS—SHEET 2.
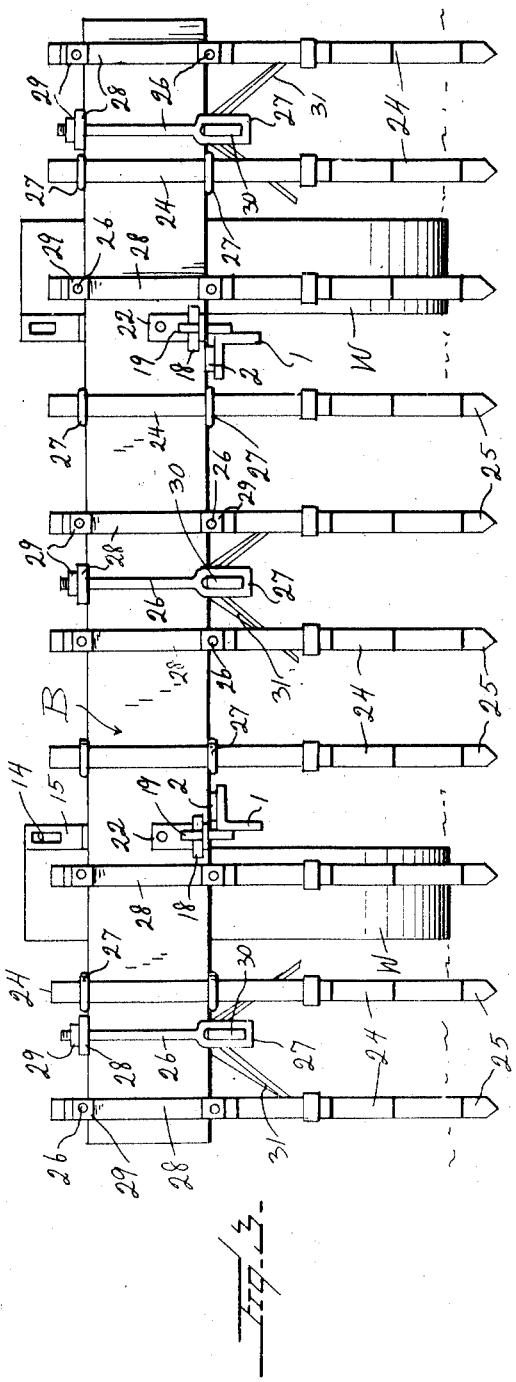
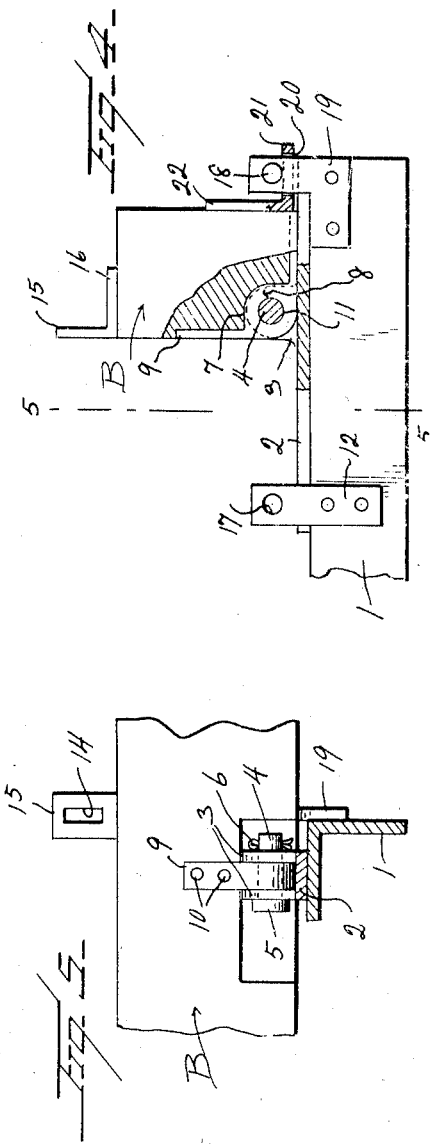
Inventor
C. C. Hamilton
By Watson E. Coleman
Attorney

UNITED STATES PATENT OFFICE.

CARROLL C. HAMILTON, OF ONTARIO, CALIFORNIA.

AGRICULTURAL IMPLEMENT.

1,341,231. Specification of Letters Patent. Patented May 25, 1920.

Application filed December 1, 1919. Serial No. 341,594.

*To all whom it may concern:*

Be it known that I, CARROLL C. HAMILTON, a citizen of the United States, residing at Ontario, in the county of San Bernardino and State of California, have invented certain new and useful Improvements in Agricultural Implements, of which the following is a specification, reference being had to the accompanying drawings.

This invention relates to certain improvements in agricultural implements, and it is an object of the invention to provide a novel and improved device of this general character provided with a beam supported for rocking movement, and wherein said beam is provided with ground working elements of different characters and carried by the beam in such a manner whereby the changing of the position of the beam permits the ground working elements of one character to be employed independently of the remainder of said ground working elements.

Another object of the invention is to provide a novel and improved implement of this character including a beam supported for rocking movement provided with two different characters of ground working elements, and wherein the adjustment of the beam determines which of the two characters of elements is in working position.

Furthermore it is an object of the invention to provide an implement of this general character including a beam supported for rotating or rocking movement and provided with ground working elements, said elements being engaged with the beam in a manner whereby the element of one character is inoperative when the beam is in one position, and in operative position when the beam is in a second position, together with means for holding the beam in either of said two positions.

Another object of the invention is to provide a novel and improved implement of this general character including a portable frame having hingedly or pivotally connected therewith a beam for swinging movement in a vertical direction, and wherein said beam is provided with a ground working element engaging the ground when the beam is in one position and a second ground working element engaging the ground when the beam is in a second position, and wherein said beam may be readily moved from one of said positions to the other without removing or altering either the beam proper or the hinged pivotal engagement of the beam with the frame.

The invention consists in the details of construction and in the combination and arrangement of the several parts of my improved agricultural implement whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in side elevation illustrating an agricultural implement constructed in accordance with an embodiment of my invention, and one series of ground working elements in working position;

Fig. 2 is a view similar to Fig. 1 showing a second series of ground working elements in working position;

Fig. 3 is a view in rear elevation of the implement as particularly illustrated in Fig. 1;

Fig. 4 is an enlarged fragmentary view partly in section and partly in elevation, illustrating a hinged or pivotal connection of the beam B, and, Fig. 5 is a sectional view taken substantially on the line 5—5 of Fig. 4.

As disclosed in the accompanying drawings, F denotes a frame supported in a conventional manner by the wheels W. The frame F is of the usual cultivator type and includes the intermediate or central beams 1, arranged substantially in parallelism. Each of the beams 1 is preferably formed of angle irons.

Secured to the rear portion of the beams 1 and substantially in alinement transversely of the frame F are the plates 2. Each of the plates 2 is provided at its opposite side marginal portions and in close proximity to its longitudinal center with the upstanding and transversely alined wings or ears 3. Disposed through said wings or ears 3 is a pivot bolt or a member 4 which braces the space between said wings or ears 3. One end portion of the pivot bolt or member 4 is provided with a head 5 to limit its lengthwise movement in one direction, and insertible through the opposite end portion of said bolt or member 4 is a cotter pin 6 or its equivalent to limit the lengthwise movement of said bolt or member in an opposite direction. By this arrangement it will be obvious that the pivot bolt or member 4 is effectually maintained in applied position, yet can be readily removed and replaced when the occasions of practice may so necessitate.

B denotes an elongated beam of wood or other desired material, and which is preferably oblong in cross section. The beam B extends longitudinally in a direction transverse of the frame F and overlies the plates 2, hereinbefore referred to. One corner of the beam B has the portions thereof adjacent the plates 2 provided with the recesses or pockets 7, in which fits a block or member 8. The block or member 8 is positioned at the heel or junction of the perpendicularly related plates 9 and integrally formed therewith. The plates 9 are adapted to be secured to adjacent faces of the beam B through the instrumentality of the rivets 10 or other anchoring means. Before the plates 9 are engaged with the beam B the block or member 8 is arranged between the wings or ears 3, so that the pivot member or bolt 4 may be disposed through the opening 11 disposed through said block or member 8. The connections between the beam B and the beams 1 of the frame F permit the beam B to be rocked or rotated through an angle of substantially 90°.

Secured to each of the beams 1 adjacent the inner end portion of the plate 2 mounted thereon is an upstanding tongue 12 which extends through a slot or opening 14, provided in the outstanding foot 15 comprised in a bracket 16. The bracket 16 is secured to a face of the beam B with the outer surface of the foot 15 substantially flush with the surface of the beam B adjacent the plate 2 when the beam B is rocked or rotated inwardly. The tongue 12 is of a length to extend above the foot 15 when the beam B is at the limit of its inward swinging or rocking movement, and the extended portion of said tongue 12 is provided with an opening 17 through which is adapted to be directed a lock pin 18 for holding the beam in such position.

Each of the beams 1 rearwardly of the beam B is provided with an upstanding tongue 19 which passes through a slot or opening 20 in the foot 21 of a bracket 22. The bracket 22 is secured to a face of the beam B with the outer face of the foot 21 substantially flush with the face of the beam B which contacts with the plate 2 when the beam B is at the limit of its outward swinging movement of rotation. The tongue 19 is of a length to extend above the foot 21, and the extended portion of said tongue is provided with an opening 23 through which the lock pin 18 is also adapted to be disposed for holding the beam B in this second adjustment or position.

When the beam B is in the second adjustment or position just referred to its major cross sectional dimension is vertically disposed, and clamped to the opposite vertical faces thereof when in such position and at predetermined points longitudinally thereof are the shanks 24 of the cultivator teeth 25 or kindred ground working elements. The clamping means preferably comprises shanks 26 overlying the remaining or shorter faces of the beam B, and provided at similar ends with the eyes 27 through which the shanks 24 of the teeth 25 are disposed. Each pair of shanks 26 coacting with a shank 24 has its opposite end portions disposed through the extremities of a plate 28 overlying the face of the beam B opposed to the face with which the shanks 24 coact. Engaged with said extremities of the shanks 26 and bearing against the extremities of the plate 28 in a conventional manner are the clamping nuts 29.

Extending across the lower or bottom face of the beam B when the beam is in this second adjustment or position are the shanks or standards 30 clamped to the beam B in substantially the same manner as hereinbefore described with respect to the shanks 24, and for which reason the parts for effecting the clamping of the shanks or standards 30 are identified by the same reference characters as the parts comprised in the clamping means for said shanks 24.

The shanks or standards 30 are preferably equidistantly spaced longitudinally of the beam B, and have suitably secured to their working end portions the shovel plows 31 of a conventional type. It is to be understood, however, that other forms or style of ground working elements may be employed in lieu of the plows 31.

From the foregoing description it is thought to be obvious that an agricultural implement constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:

1. An agricultural implement comprising a frame, a beam resting upon the frame and connected thereto for rocking movement, upstanding tongues carried by the frame at opposite sides of the beam, a pair of brackets carried by the beam, each of said brackets including a part provided with an opening, one of said brackets coacting with one of the tongues and the second bracket coacting with the second tongue, each of said tongues extending through the opening of a bracket when the beam is at substantially the limit of its movement in a direction toward said tongue, a retaining member coacting with the tongue and the bracket for holding the beam against movement, and angularly related ground working elements carried by the beam.

2. An agricultural implement comprising a frame, a plate carried by said frame and provided with a pair of upstanding ears, a beam extending across the frame and overlying the plate, a member secured to and inset within the beam, said member extending between the ears of the plate, a pivot member disposed through the ears and the member for hingedly connecting the beam to the plate, and means for holding the beam against movement when at substantially its limit of movement in either direction about the pivot member.

3. An agricultural implement comprising a frame, a plate carried by said frame and provided with a pair of upstanding ears, a beam extending across the frame and overlying the plate, a member secured to and inset within the beam, said member extending between the ears of the plate, a pivot member disposed through the ears and the member for hingedly connecting the beam to the plate, means for holding the beam against movement when at substantially its limit of movement in either direction about the pivot member, said first-named member being provided with angularly related plates overlying adjacent faces of the beam, and means for securing said plates to the beam.

In testimony whereof I hereunto affix my signature.

CARROLL C. HAMILTON.